United States Patent

Bechtle

[19]

[11] Patent Number: 5,872,715
[45] Date of Patent: Feb. 16, 1999

[54] AUTOMATIC INSPECTION AND CERTIFICATION SYSTEM

[76] Inventor: Samuel J. Bechtle, 209 W. Paseo de Cristobal, San Clemente, Calif. 92672

[21] Appl. No.: 895,046

[22] Filed: Jul. 16, 1997

[51] Int. Cl.$^6$ .................................................. G06F 19/00
[52] U.S. Cl. .............................. 364/474.09; 364/468.15; 364/468.16; 364/474.16; 83/73; 83/364
[58] Field of Search ...................... 364/474.09, 468.21, 364/468.24, 469.01, 468.15, 468.16, 474.16; 83/72–74, 76, 360–362, 364, 365, 370

[56] References Cited

U.S. PATENT DOCUMENTS

| | | | |
|---|---|---|---|
| 3,093,020 | 6/1963 | Walsh | 83/106 |
| 3,318,180 | 5/1967 | Bauman et al. | 83/287 |
| 3,373,584 | 3/1968 | Rundt et al. | 72/10 |
| 3,406,601 | 10/1968 | Clifford | 83/72 |
| 3,448,647 | 6/1969 | Miller et al. | 83/423 |
| 3,455,194 | 7/1969 | Burger | 83/352 |
| 3,527,129 | 9/1970 | Schlesser | 83/287 |
| 3,596,549 | 8/1971 | Miyazaki | 83/37 |
| 3,742,795 | 7/1973 | Lipcon et al. | 83/13 |
| 3,808,928 | 5/1974 | Plegat | 83/289 |
| 3,864,816 | 2/1975 | Brusch | 29/563 |
| 4,339,972 | 7/1982 | Wepner et al. | 83/13 |
| 4,585,600 | 4/1986 | Rollyson et al. | 83/289 |
| 4,934,225 | 6/1990 | Languillat et al. | 82/53.1 |
| 5,406,870 | 4/1995 | Suitts et al. | 83/23 |
| 5,777,879 | 7/1998 | Sommerfeldt | 364/469.04 |

*Primary Examiner*—Paul P. Gordon
*Attorney, Agent, or Firm*—Donald E. Stout

[57] ABSTRACT

A transporting apparatus transports tubing in a forward direction. A tubing cutter is disposed along the transporting apparatus, and is activated at predetermined time intervals to cut a source of tubing into cut tubing portions as the source of tubing is being transported past the tubing cutter along the transporting apparatus. A first sensor is disposed along the transporting apparatus for detecting the leading edge of the cut tubing portion as the cut tubing portion passes by the first sensor on the transporting apparatus. A second sensor detects the leading edge of the cut tubing portion at a subsequent time. A length determiner determines the length of the cut tubing portion, based upon a first amount of time between two activations of the tubing cutter that were used to cut the front and rear portions of the cut tubing portions. The length determiner also measures a second amount of time between detections of the leading edge of the cut tubing portion by the first sensor and by the second sensor. The tubing length is determined using the first and second amounts of time.

21 Claims, 3 Drawing Sheets

Fig. 1

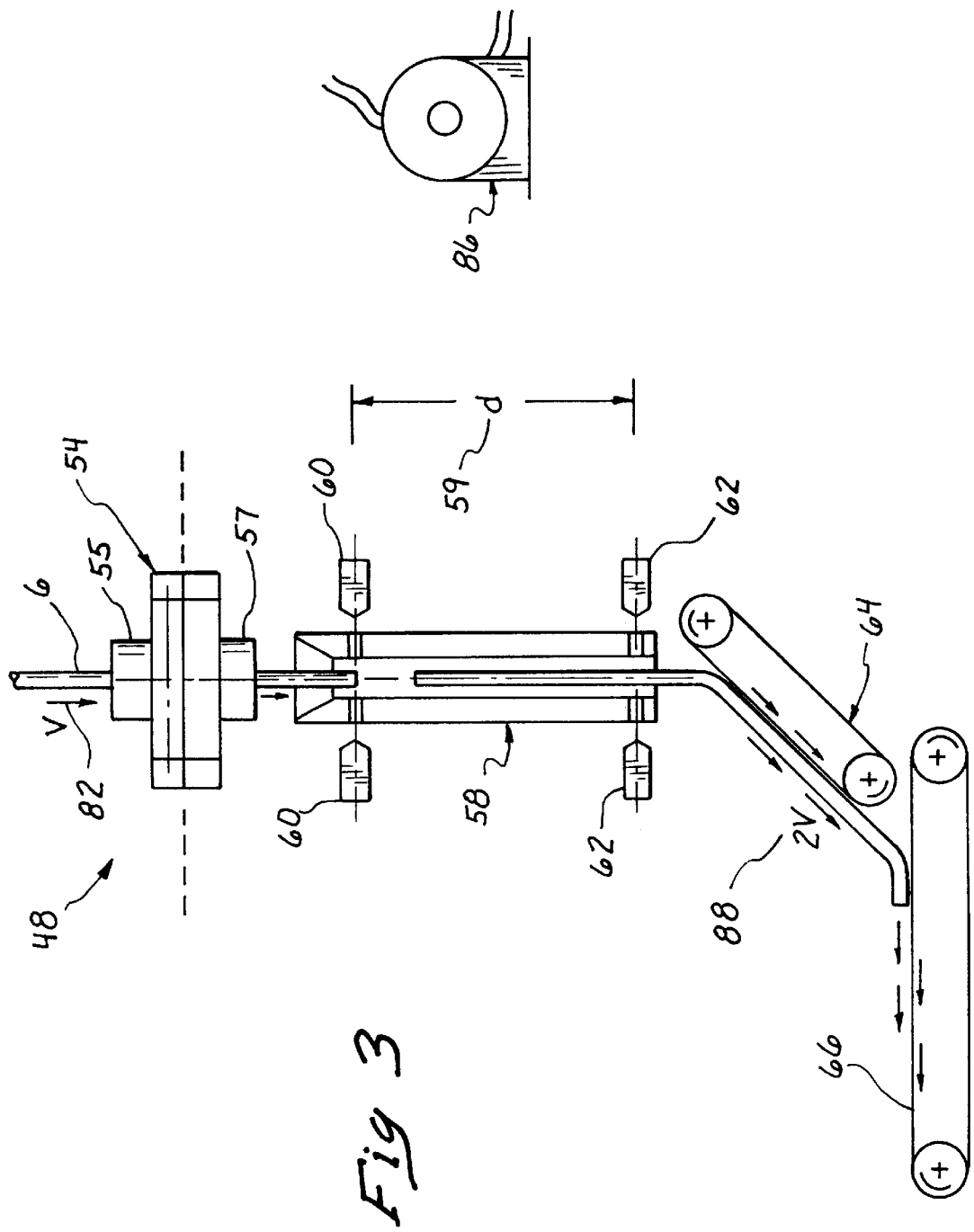

AUTOMATIC INSPECTION AND CERTIFICATION SYSTEM

FIELD OF THE INVENTION

The present invention relates generally to a system for cutting flexible tubing and, more particularly, to a system for automatically monitoring the precision of cut tubing portions and certifying cut tubing portions which pass minimum specifications.

BACKGROUND OF THE INVENTION

The prior art has proposed a variety of mechanisms for generating and packaging flexible medical tubing. Various types of cutters, for example, have been used in cutting and collection processes. Many systems employ a manual method for monitoring the tubing diameter of cut tubing, by manually measuring the tubing diameter of samples taken at periodical intervals and analyzing these measurements using statistics. These manual methods are subject to error, since momentary variations in diameter may occur, for example. Momentary variations in diameter, resulting from momentary disruptions in a previous extrusion process, may be missed altogether by manual sample taking methods. Other approaches for monitoring the tubing diameter have incorporated laser measurement techniques, which may be programmed to shut the tube cutting machine down or to sound a buzzer when a tubing diameter is out of specification.

In addition to controlling the diameter of cut tubing portions, the prior art has also endeavored to control the length of these cut tubing portions. One method used by the prior art utilizes a pulse generator, which is driven by frictional contact with the moving cut tube portions. Pulses from the pulse generator provide an indication of movement length of the cut tube portion, for any given time period. By calibration of time interval pulse counts and lengths generated and measured by hand, approximate tubing lengths can be "dialed" into the operation by the machine operator. Corrections for machine speed and shrinkage variations may also be made.

One problem associated with this method results from slippage between the tube product and the pulse generator drive wheel. This slippage may introduce errors in the measured tubing length. Several attempts have been made by the prior art to automate the length control, and to compensate for machine speed variations. U.S. Pat. No. 4,585,600 uses the counting and storage of generated pulses between when the forward end of a cut propellant passing in sequence between two sensors as means for signalling a cutter. U.S. Pat. No. 3,406,601 uses a product movement-actuated-pulse-generator and at least one downstream sensor to actuate a cutter. Errors are minimized by further downstream checkpoints and feedback.

While these prior art approaches have been somewhat successful, an efficient and reliable length measuring device that is independent of slippage has not yet been developed. Additionally, a fully automated system for measuring cut tube portion diameters and lengths, and for feeding this data to a statistical controller, has not been developed. Nor has the prior art developed a controller for utilizing statistical data for sorting unacceptable cut tubing portions from acceptable cut tubing portions, and for generating certification printouts for each batch of cut tubing portions.

SUMMARY OF THE INVENTION

The present invention provides an automatic inspection and certification system for cutting precision flexible tubing. Outside diameters and cut lengths of the cut tubing portions are accurately monitored against preset standards. The monitored information is automatically retained by a controller for subsequent use in counting and sorting acceptable cut tubing portions into predetermined stacks, while sending unacceptable cut tubing portions to a different location. Information of a particular batch of cut tubing portions can then be printed in a certification report, or a statistical process control chart may be printed. The present invention thus provides an automated inspection and control system, which can prevent certain functional defects from occurring in subsequent assembled products. The measurement, sorting, and counting capabilities provided by the present invention are performed automatically, thus providing labor savings and improving the delivered quality of the cut tubing portions.

The present invention focuses on the fact that certain defects, if caught and removed in the process of cutting, can prevent functional defects in subsequent downstream operations that use the cut tubing portions. The flexible, medical tubing portions produced by the present invention have lengths and diameters that are maintained within close tolerances in order to prevent volume disparities or joint lengths in the handling of fluids such as blood, I.V. solutions, and medications, for example. The cut tubing portions of the present invention may be used in other applications where the length and diameter of the flexible tubing must be controlled to prevent process problems or leaks at connection joints.

According to one broad aspect of the present invention, a transporting apparatus is provided for transporting tubing in a forward direction. A tubing cutter is disposed along the transporting apparatus, and is activated at predetermined time intervals to cut a source of tubing into cut tubing portions as the source of tubing is being transported past the tubing cutter along the transporting apparatus. A first sensor is disposed along the transporting apparatus for detecting the leading edge of the cut tubing portion as the cut tubing portion passes by the first sensor on the transporting apparatus. A second sensor detects the leading edge of the cut tubing portion at a subsequent time. A length determiner determines the length of the cut tubing portion, based upon a first amount of time between two activations of the tubing cutter that were used to cut the front and rear portions of the cut tubing portions. The length determiner also measures a second amount of time between detections of the leading edge of the cut tubing portion by the first sensor and by the second sensor. The tubing length is determined using the first and second amounts of time.

According to another broad aspect of the present invention, a diameter measurer is disposed along the transportation medium for generating an outer diameter measurement of each cut tubing portion passing thereby. A controller automatically inputs the measured diameter generated by the diameter measurer, and also automatically inputs the measured length generated by the length determiner. The controller determines whether these measured lengths and diameters are acceptable. A sorter routes cut tubing portions with unacceptable diameters or lengths to a rejection area, and a stacking assembly stacks the remaining cut tubing portions onto a conveyor belt for subsequent packaging.

The present invention, together with additional features and advantages thereof, may best be understood by reference to the following description taken in connection with the accompanying illustrative drawings.

BRIEF DESCRIPTION OF THE DRAWINGS

FIG. 1 is a front elevational view of the automatic inspection and certification system of the presently preferred embodiment;

FIG. 3 is an enlarged, front elevational view of the tubing cutting and length measurement portion of the automatic inspection and certification system shown in FIG. 1.

DESCRIPTION OF THE PREFERRED EMBODIMENT

Figure 1:
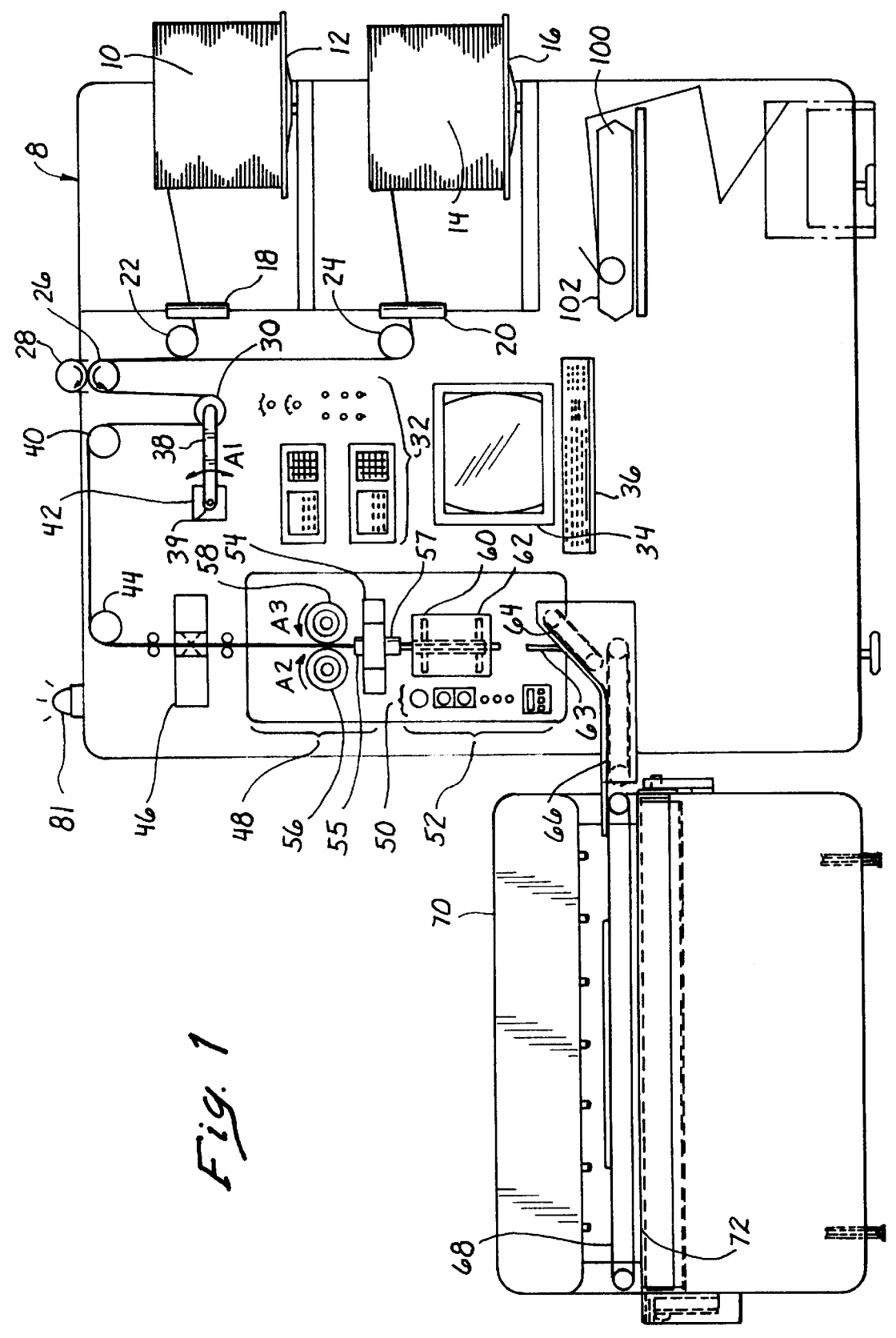
Figure 2:
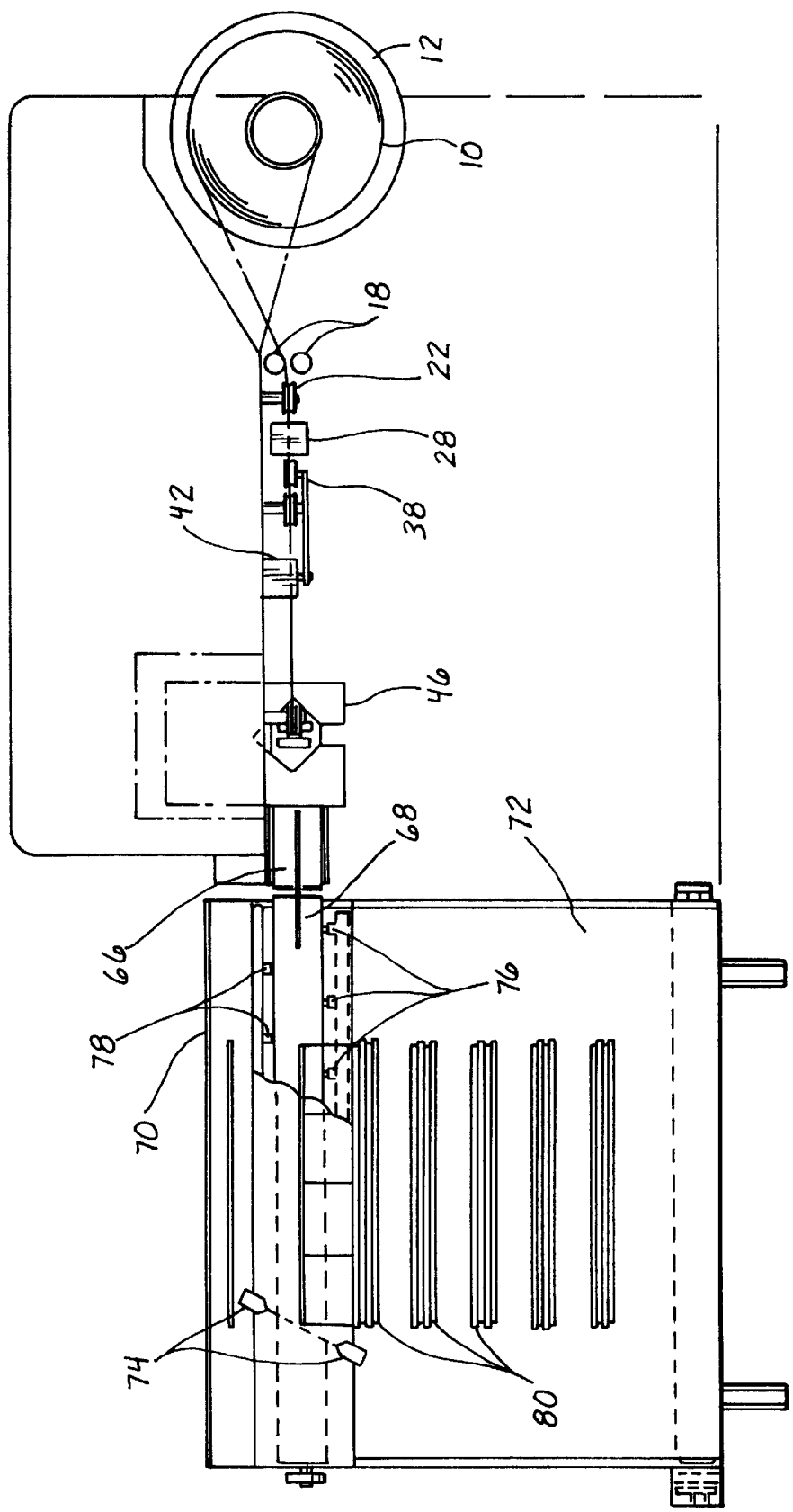
FIG. 2 is a top planar view of the automatic inspection and certification system of the presently preferred embodiment.

Turning to FIG. 1, the automatic inspection and certification system 8 is illustrated in schematic form. This automatic inspection and certification system 8 is capable of providing continuous feedback of information, relative to preset specifications. The automatic inspection and certification system 8 uses the continuous feedback information for automatic sorting and certification functions, which may be performed in real time without human intervention.

The two rolls of tubing 10, 14 are mounted on roller-bearing mounted unwind plates 12, 16, which are equipped with adjustable diameter center posts to keep the rolls of tubing 10, 14 centered on the unwind plates 12, 16. An adjustable friction device (not shown) is preferably provided to keep the roll momentum of the two rolls of tubing 10, 14 from moving beyond a desirable limit when slowing or stopping of the machine drive is performed. Only one of the two rolls of tubing 10, 14 is used at any given time, and the other of the two rolls of tubing 10, 14 remains in a standby mode for replacement without stopping the machine, except for rethreading.

Initially, one end of the roll of tubing 10 is threaded through a pair of centering rolls 18, and subsequently fed around the pulley 22. The end of the tubing is then routed up and through a motor driven nip roll assembly, which comprises two nip rolls 26, 28. The two nip rolls 26, 28 isolate unwind variations and snag forces from the subsequent operation of the system. The end of the tubing passes from the pair of nip rolls 26, 28 around a roll 30, which is mounted on a pivoting arm 38. The pivoting arm regulates the on/off and speed of the nip roll assembly 26, 28 in order to maintain the unwind speed at a rate which is consistent with the speed of the cutter drive rollers 56, 58. Specifically, the tension in the tubing passing around the roll 30 is determined by the weight of both the pivot arm 38 and the roll 30 held up by the tubing. The weight of these two items 38, 30 is basically a constant force.

The pivot arm 38 preferably pivots about a pivot 39 in the direction of arrow A1. This pivot 39 is actually the shaft of a variable controller 42, which regulates the orientation of the pivoting arm 38 along the range of movement indicated by the arrow A1. When the pivoting arm 38 is pivoted in a downward direction about the pivot 39, the motor driven nip rolls 26, 28 rotate at slower angular velocities. Conversely, when the roller 30 is moved in an upward direction about the pivot 39 (indicating that the rollers 56, 58 are moving at a greater speed than the two nip rolls 26, 28) the two nip rolls 26, 28 move with greater angular velocities. These controlling conditions serve to keep the speeds of the tubing in balance and, further, to maintain constant tension on the tubing drive and cutter section 48.

The tubing is fed from the roller 30 over several rollers or pulleys 40, 44, and then through a diameter measuring device 46. As presently preferred, the diameter measuring device 46 comprises a dual-axis laser micrometer. The diameter measuring device 46 measures the outside diameter of the tubing by averaging two diameter readings of the tubing, taken 90 degrees apart. These two orthogonal readings compensate for any flattening condition present in the tubing from being wound on the roll of tubing 10. The continuous measurement of the outside diameter of the tubing is automatically compared with pre-programmed limits, and is fed into a control system (not shown) for data storage, rejection mechanisms for out-of-specification tubing, S.P.C. control charting, and certification reports. The controls 32 and 52, among others, help to determine the operation of the controller.

The tubing passes from the diameter measuring device 46 into a tubing drive and length cutter 48. The tubing drive and length cutter 48 is controlled by the speed and cut length settings 50. In the presently preferred embodiment, the tubing cutter 54 is vertically mounted, but the tubing cutter 54 may also be mounted horizontally, according to preference. The tubing passes through a first bushing 55 located before the tubing cutter 54, and through a second bushing 57 located after the tubing cutter 54. A small space is provided between the two bushings 55, 57 for the blade of the tubing cutter 54. When the tubing cutter 54 is activated, a flying knife passes between the two bushings 55, 57, making a clean cut through the tubing. The cut tubing portion continues to move downward through a channelizer 58 (FIG. 3) to the length-measuring device 52.

The length-measuring device 52 comprises a first sensor 60 and a second sensor 62. One purpose of the length-measuring device 52 is to provide an on-line secondary determination of the length of the tubing being cut by the tubing cutter 54. The two sensors 60, 62 are spaced at a distance, "d", 59 (FIG. 3). Each sensor detects the point in time when the forward end of a new cut tubing portion passes by the sensor. Thus, the two sensors 60, 62, together, provide a period of time taken by the cut tubing portion to pass through the distance d. The trailing edge of a previously cut tubing portion serves to "arm" the sensors for the new cut tubing portion as it arrives. High-frequency and independently generated pulses are generated by a pulse generator 86 (FIG. 3).

The number of pulses occurring between the detection of the leading edge of the cut tubing portion by the first sensor 60 and the detection of the leading edge of the cut tubing portion by the second sensor 62 are counted. Using this counted number of pulses and the distance d, an indication of the rate of travel of the cut tubing portion may be obtained. Thus, the travelling velocity of the cut tubing portion may be indicated as a speed expressed in distance per pulse, by dividing the counted number of pulses into the distance.

The number of pulses generated by the pulse generator 86 is also counted between activations of the tubing cutter 54, for the cut tubing portion of interest. This counted number reflects the number of pulses generated from the time that the leading edge of the cut tubing portion is cut and the time that the trailing edge of the cut tubing portion is cut. The ratio of the number of pulses between activations of the tubing cutter 54 compared to the number of pulses between detections of the first and second sensors 60, 62, times the distance d, yields the determined length of the cut tubing portion. In other words, the expression of the travelling velocity of the cut tubing portion, expressed in distance per pulse, multiplied by the number of pulses between the two activations of the tubing cutter 54 (required to cut the cut tubing portion) provides an indication of the length of the cut tubing portion.

The cut tubing portion 63 is deflected and carried by a conveyor 64, and is then carried by another conveyor 66.

The cut tubing portion is then fed onto a sorting conveyor belt 68. As shown in FIG. 2, the cut tubing portion travels along the sorting conveyor belt 68 in a direction away from the conveyor 66 and toward the sensors 74. When the cut tubing portion trips the sensors 74, the controller activates either the first blowers 76 to blow the cut tubing portion into the reject bin 70, or activates the second blowers 78 to blow the cut tubing portion onto the flat belt conveyor 72.

Cut tubing portions having diameters or lengths within unacceptable ranges are blown onto the reject bin 70. The acceptable cut tubing portions are blown onto the flat belt conveyor 72. The warning light 81 (FIG. 1) may be activated when a predetermined number of cut tubing portions are blown into the reject bin 70, when a length or diameter of a cut tubing portion falls out of a predetermined range, or when other criteria are met.

The acceptable cut tubing portions are blown into a group on the flat belt conveyor 72 until a predetermined number of cut tubing portions have been blown into the group. Once the predetermined number of cut tubing portions are blown into a group on the flat belt conveyor 72, the flat belt conveyor 72 indexes a preprogrammed distance, driven by a stepping motor (not shown) or other conventional means, and a new group of cut tubing portions begins to accumulate. The inspected, counted, and stacked cut tubing portions begin to advance toward the end of the flat belt conveyor 72 by these successive indexes. An operator collects the groups of accepted cut tubing portions 80 from the flat belt conveyor 72 at regular intervals. These groups 80 may then be bundled, boxed, or further processed.

After a desired number of groups of accepted cut tubing portions 80 have been produced, the data and information on sizes, plots of statistical process control (S.P.C.) charts, rejects, and other statistical and operational information, may be compiled by the controller and printed by the printer 100 (FIG. 1). Additionally, a certification printout 102 of the results and the range of acceptable measurements may be generated.

FIG. 3 illustrates an exploded view of the cutting and measuring portion of the automatic inspection and certification system 8 shown in FIG. 1. The tubing enters the tubing drive and cutter 48 with a first velocity 82, and is cut by a flying knife in a plane 84 located between the first bushing 55 and the second bushing 57. The cut tubing portion exits the tubing cutter 54 with a second velocity 88, which is preferably twice the first velocity 82.

The controller of the present invention may be preprogrammed to cut various lengths of tubing in sequence, accumulating groups 80 (FIG. 2) on the flat belt conveyor 72 for "kitting" purposes such as feeding a just-in-time (JIT) production operation. Additionally, the controller of the present invention may be preprogrammed to cut a series of batches of tubes, where each batch is a particular length, and each batch is accumulated in a different group 80. The controller may also be programmed to shut down and activate the warning light 81 (FIG. 1) when the roll of tubing 10 (FIG. 1) is used up. The warning light 81, and an optional buzzer, may be activated together every time a reject cut tubing portion is detected, or when several reject cut tubing portions are detected within a short period of time, thus indicating a material or machine control problem of significance.

Although an exemplary embodiment of the invention has been shown and described, many other changes, modifications and substitutions, in addition to those set forth in the above paragraph, may be made by one having ordinary skill in the art without necessarily departing from the spirit and scope of this invention.

I claim:

1. An automatic inspection and certification system for cut tubing portions, comprising:
    a transporting apparatus for transporting tubing in a forward direction;
    a tubing cutter disposed along the transporting apparatus, the tubing cutter being activated at predetermined time intervals to cut tubing into cut tubing portions as the tubing is being transported past the tubing cutter along the transporting apparatus, each cut tubing portion having a leading edge and a trailing edge;
    a first sensor disposed along the transporting apparatus forwardly of the tubing cutter, the first sensor being adapted to detect the leading edge of a cut tubing portion as the cut tubing portion is transported past the first sensor along the transporting apparatus;
    a second sensor disposed along the transporting apparatus forwardly of the first sensor, the second sensor being adapted to detect the leading edge of a cut tubing portion as the cut tubing portion is transported past the second sensor along the transporting apparatus; and
    a length determiner for determining a length of a cut tubing portion, based upon a first amount of time between two of the predetermined time intervals, and also based upon a second amount of time between the detecting of the leading edge of the cut tubing portion by the first sensor and the detecting of the leading edge of the cut tubing portion by second sensor.

2. The automatic inspection and certification system according to claim 1, wherein the tubing comprises flexible tubing.

3. The automatic inspection and certification system according to claim 1, further comprising a timer for measuring the first amount of time and the second amount of time.

4. The automatic inspection and certification system according to claim 3, wherein the timer is adapted to generate a plurality of consecutive pulses.

5. The automatic inspection and certification system according to claim 4, wherein the length determiner counts a first number of pulses generated by the timer during the first amount of time, and counts a second number of pulses generated by the timer during the second amount of time.

6. The automatic inspection and certification system according to claim 5, wherein the first sensor is disposed along the transportation apparatus a predetermined distance forwardly of the second sensor.

7. The automatic inspection and certification system according to claim 6, wherein the length determiner is adapted to determine the length of a cut tubing portion by multiplying the first number of pulses by the predetermined distance, and dividing the product by the second number of pulses.

8. A length-measuring device for measuring lengths of cut tubing portions, which are cut at predetermined time intervals of time by a tubing cutter, as the cut tubing portions are transported in a forward direction along a transporting apparatus, comprising:
    a first sensor adapted to be disposed at a first location along the transporting apparatus, the first sensor adapted for sensing a leading edge of a cut tubing portion as the cut tubing portion is transported past the first sensor along the transporting apparatus;
    a second sensor adapted to be disposed at a second location along the transporting apparatus, the second sensor adapted for sensing the leading edge of the cut tubing portion as the cut tubing portion is transported past the second sensor along the transporting apparatus, the second sensor sensing the leading edge of the cut tubing portion after the first sensor has sensed the leading edge of the cut tubing portion; and a length determiner for determining a length of a cut tubing portion, based upon a first amount of time between two of the predetermined time intervals, and also based upon a second amount of time between the detecting of the leading edge of the cut tubing portion by the first sensor and the detecting of the leading edge of the cut tubing portion by second sensor.

9. The length measuring device according to claim 8, further comprising a timer, which is adapted to generate a plurality of consecutive pulses.

10. The length measuring device according to claim 9, wherein the length determiner counts a first number of pulses generated by the timer during the first amount of time, and counts a second number of pulses generated by the timer during the second amount of time.

11. The length measuring device according to claim 10, wherein the first sensor is disposed along the transportation apparatus a predetermined distance forwardly of the second sensor, and wherein the length determiner is adapted to determine the length of a cut tubing portion by multiplying the predetermined distance by a ratio of the first number of pulses over the second number of pulses.

12. A system for cutting flexible tubing, comprising:

a transporting apparatus for transporting cut tubing portions in a forward direction;

a diameter measurer disposed along the transportation apparatus, the diameter measurer being adapted to generate an outer diameter measurement of each cut tubing portion;

a length measurer disposed along the transportation apparatus for measuring a length of each cut tubing portion;

a controller for inputting the measured diameter and the measured length, and for determining whether the measured diameter and the measured length are acceptable; and a sorter disposed along the transportation apparatus for routing cut tubing portions with unacceptable diameters or lengths to a rejection area.

13. The system for cutting flexible tubing according to claim 12, wherein the diameter measurer is adapted to generate a measurement of an outside diameter of a cut tubing portion along a first axis, which is perpendicular to a length of the cut tubing portion, and wherein the diameter measurer is adapted to generate a second measurement of an outside diameter of a cut tubing portion along a second axis, which is perpendicular to both the first axis and to the a length of the cut tubing portion.

14. The system for cutting flexible tubing according to claim 13, wherein the outer diameter measurement generated by the diameter measurer comprises an average of the first measurement and the second measurement.

15. The system for cutting flexible tubing according to claim 14, wherein the diameter measurer comprises a dual-axis laser micrometer.

16. The system for cutting flexible tubing according to claim 12, wherein the sorter maintains a count of the cut tubing portions routed to the rejection area, and also maintains a count of the cut tubing portions not routed to the rejection area.

17. The system for cutting flexible tubing according to claim 16, wherein the controller is adapted to output statistical process control (SPC) information.

18. The system for cutting flexible tubing according to claim 12, further comprising a certification printout station, wherein the controller is adapted to output information to the certification printout station in order to instruct the certification printout station to generate a certification printout.

19. The system for cutting flexible tubing according to claim 12, wherein the stacking assembly comprises a first plurality of blowers for blowing the tubing portions with unacceptable diameters to the rejection area, and wherein the stacking assembly comprises a second plurality of blowers for blowing the tubing portions with acceptable diameters to the stacking assembly.

20. The system for cutting flexible tubing according to claim 19, wherein the stacking assembly comprises a conveyer belt for accepting the tubing portions with acceptable diameters onto a first area thereof, the conveyer belt advancing a predetermined distance after a preselected number of tubing portions with acceptable diameters has accumulated onto the first area to thereby begin accumulation of a preselected number of tubing portions with acceptable diameters onto a second area of the conveyer belt.

21. A method of controlling a quality of cut flexible tubing, comprising the following steps:

cutting a cut tubing portion from a supply of tubing;

generating an outer diameter measurement of the cut tubing portion;

generating a length measurement of the cut tubing portion;

inputting the outer diameter measurement and the length measurement into a controller;

determining by the controller whether the outer diameter measurement and the length measurement are acceptable; and routing cut tubing portions with unacceptable diameters or lengths to a rejection area.

* * * * *